United States Patent [19]

Yamamoto

[11] 4,428,140
[45] Jan. 31, 1984

[54] GUIDE DEVICE FOR FISHING LINES

[75] Inventor: Shigeru Yamamoto, Higashikurume, Japan

[73] Assignee: Daiwa Seiko Inc., Tokyo, Japan

[21] Appl. No.: 233,133

[22] Filed: Feb. 10, 1981

[30] Foreign Application Priority Data

Mar. 7, 1980 [JP] Japan .............................. 55-29722[U]

[51] Int. Cl.³ ............................................ A01K 87/04
[52] U.S. Cl. ...................................................... 43/24
[58] Field of Search ............................. 43/24; 72/379; 242/157 R

[56] References Cited

U.S. PATENT DOCUMENTS

| | | | |
|---|---|---|---|
| 387,545 | 8/1888 | Spruce et al. | 43/24 |
| 2,145,813 | 1/1939 | Kannegieter | 242/157 R |
| 3,690,027 | 9/1972 | Ohmura | 43/24 |
| 4,141,132 | 2/1979 | Ohmura | 43/24 |
| 4,174,583 | 11/1979 | Ohmura | 43/24 |

*Primary Examiner*—Nicholas P. Godici
*Assistant Examiner*—Marc Hodak

*Attorney, Agent, or Firm*—Browdy and Neimark

[57] ABSTRACT

A guide device for fishing lines formed by punching a single piece of sheet metal and subjecting the resulting sheet metal to a bending step. It consists of a guide ring for a fishing line and a mount for a fishing rod, which are integrally formed. The mount is composed of two legs, which are extended in the opposite directions from a lower portion of the guide ring such that one of the legs is extended inside the guide ring with the other extended outside the guide ring, to allow the legs to have the same width and to be set on a fishing rod in a balanced condition. Since the legs are extended from a lower portion of the guide ring, it is never caught by a fishing line while in use. The guide ring is reinforced at its inner circumferential surface with a ring of a synthetic resin having a hard inner ring fitted into the inner circumferential surface of the reinforcement ring. The reinforcement ring is firmly fitted into recesses provided in the inner circumferential surface of the guide ring. The reinforcement ring permits a fishing line to be guided smoothly and serves to prevent a fishing line from being worn in a short time.

13 Claims, 9 Drawing Figures

FIG. 5
FIG. 6
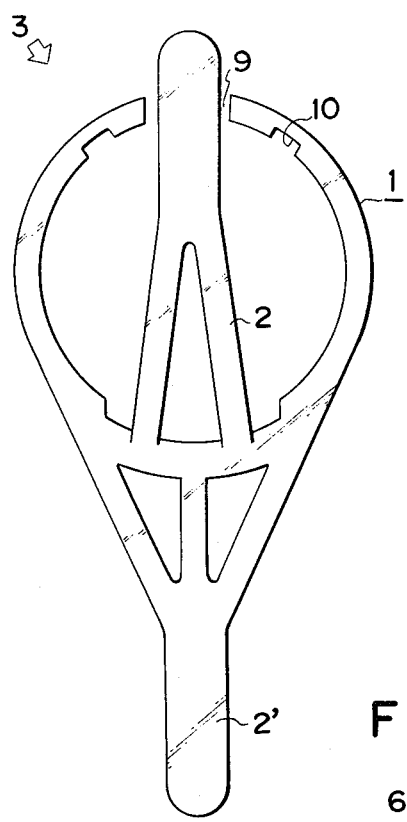
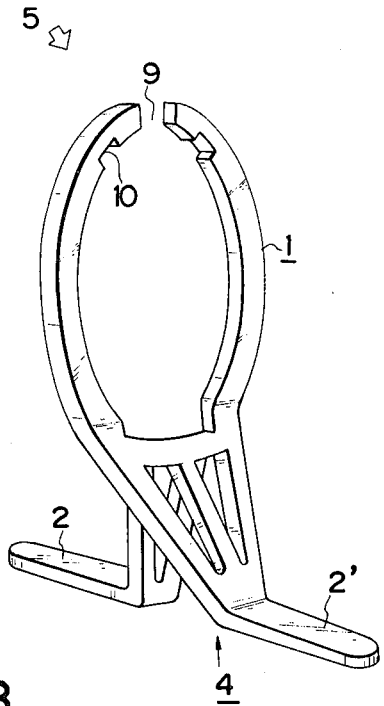
FIG. 8
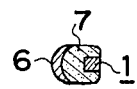
FIG. 7
FIG. 9
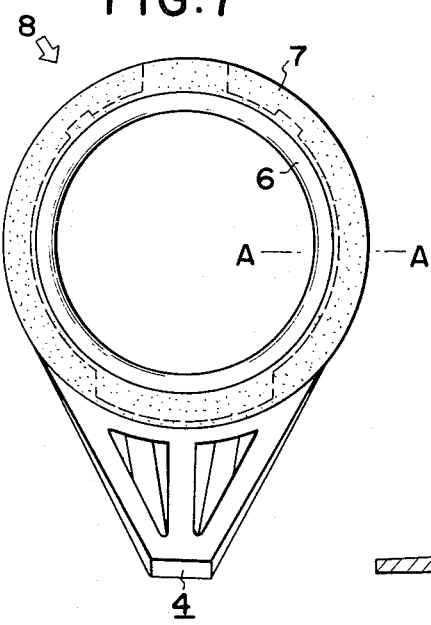
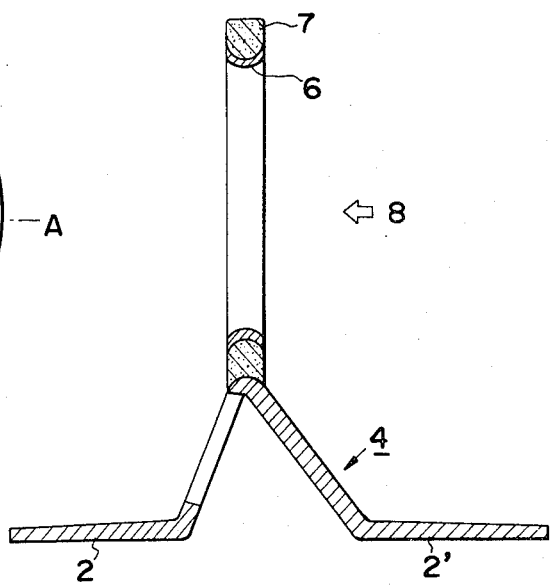

GUIDE DEVICE FOR FISHING LINES

BACKGROUND OF THE INVENTION

The present invention relates to an improvement in a guide device for fishing lines.

A guide device for fishing lines, in which a guide ring for a fishing line and a mount for a fishing rod are integrally formed by punching a single piece of sheet metal, is known from U.S. Pat. No. 3,690,027. In this guide device for fishing lines, a front leg of a mount is punched out of such a section of a piece of sheet metal that corresponds to a region between rear legs of the mount. Accordingly, the front leg naturally has a small width, while the rear legs combined have a large width. Therefore, when this guide device is mounted on a fishing rod, it cannot be kept in a balanced state. Especially, the front leg cannot be set on a fishing rod in a stable manner. Since the rear legs are set on a fishing rod such as to be projected outwardly from the guide ring, a fishing line, while it is in practical use, often gets entangled in the same legs. In addition, it is necessary that a recess between the rear legs, out of which the front leg has been punched, be closed later.

In the above guide device, a fishing line is guided by the guide ring as the former is in direct contact with the latter. Accordingly, the fishing line becomes worn in a short period of time. Moreover, the guide ring does not have a sufficiently high strength.

SUMMARY OF THE INVENTION

An object of the present invention is to eliminate the above-mentioned drawbacks encountered in a conventional guide device for fishing lines of this kind.

Another object of the present invention is to provide a guide device for fishing lines, consisting of a guide ring for a fishing line, which has a sufficiently high strength and which permits a fishing line to be guided smoothly, and a mount for a fishing rod, which are integrally formed with the guide ring and capable of being set on a fishing rod in a stable manner.

The primary characteristics of the present invention reside in a guide device for fishing lines, in which a guide ring for a fishing line and a mount for a fishing rod are integrally formed by punching a single piece of sheet metal, the mount consisting of integrally formed front and rear legs extended in opposite directions from a base portion, i.e. a lower portion of the guide ring such that one of the legs is extended inside the guide ring with the other extended outside the guide ring, to thereby allow the front and rear legs to have the same width and to be set on a fishing rod in a stable and balanced state, with both of the front and rear legs extending from a lower portion of the guide ring never being caught by a fishing line.

The secondary characteristics of the present invention reside in that a separately prepared ring unit for a fishing line is fitted in an annular portion of a guide body from the inside thereof to reinforce the guide body consisting of a single piece of sheet metal and having a comparatively low strength, and to smoothly guide a fishing line in contact with the ring unit, the fishing line thereby being prevented from being worn in a short period of time.

The third characteristics of the present invention reside in that a guide body is so punched out of a single piece of sheet metal that a portion of a guide ring that is opposed to a front leg of a mount is split to form a gap and thereby allow the front leg to be extended therethrough, the front and rear legs of the mount being then able to be formed to substantially the same arbitrary length.

Other characteristics of the present invention reside in that a guide ring is provided in its inner circumferential surface with an annular recess in which a reinforcement ring of a synthetic resin, which has a hard inner ring fitted in the inner circumferential surface thereof, is firmly fitted such that the annular recess in the guide ring is filled with a portion of the reinforcement ring that consists of a synthetic resin, the reinforcement ring never coming off from the guide ring while the guide device is in practical use.

Still other characteristics of the present invention reside in that a guide body can be produced by merely bending front and rear legs of a mount after the guide body has been punched out from a piece of sheet metal, with a reinforcement ring for a fishing line adapted to be easily fitted into the inner circumferential surface of a guide ring, this guide device, which can be obtained by extremely simple manufacturing steps, being suited for mass-production.

The above and other objects as well as advantageous features of the invention will become apparent from the following description of the preferred embodiments taken in conjunction with the accompanying drawings.

BRIEF DESCRIPTION OF THE DRAWINGS

FIGS. 1-4 illustrate the manufacturing steps for a guide device for fishing lines of a first embodiment of the present invention, wherein FIG. 1 is a plan view of a flat frame punched out from sheet metal;

FIG. 2 is a perspective view of a guide body obtained by subjecting the flat frame shown in FIG. 1 to a bending step;

FIG. 3 is a front elevational view of a guide device obtained by fitting a reinforcement ring for a fishing line into recesses in the inner circumferential surface of a guide ring of the guide body shown in FIG. 2; and FIG. 4 is a longitudinal sectional view of the guide device shown in FIG. 3.

FIGS. 5-9 illustrate the manufacturing steps for a guide device for fishing lines of a second embodiment of the present invention, wherein FIG. 5 is a plan view of a flat frame punched out from sheet metal;

FIG. 6 is a perspective view of a guide body obtained by subjecting the flat frame shown in FIG. 5 to a bending step;

FIG. 7 is a front elevational view of a guide device obtained by fitting a reinforcement ring for a fishing line into recesses in the inner circumferential surface of a guide ring of the guide body shown in FIG. 6;

FIG. 8 is a sectional view taken along the line A—A in FIG. 7; and

FIG. 9 is a longitudinal sectional view of the guide device shown in FIG. 7.

DESCRIPTION OF THE PREFERRED EMBODIMENTS

A first embodiment of the present invention will be described with reference to FIGS. 1-4.

Figure 1:
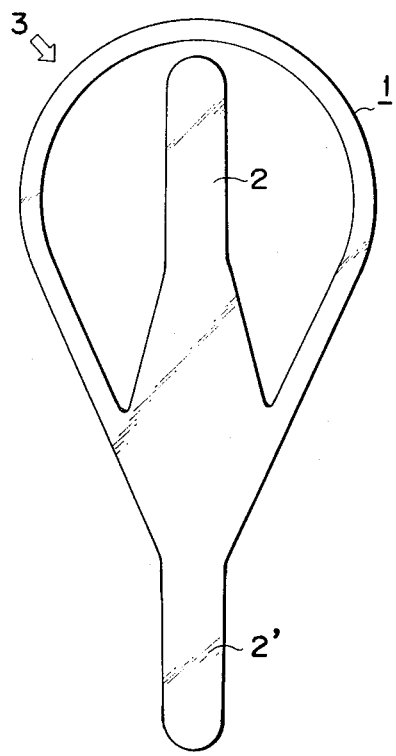
Figure 2:
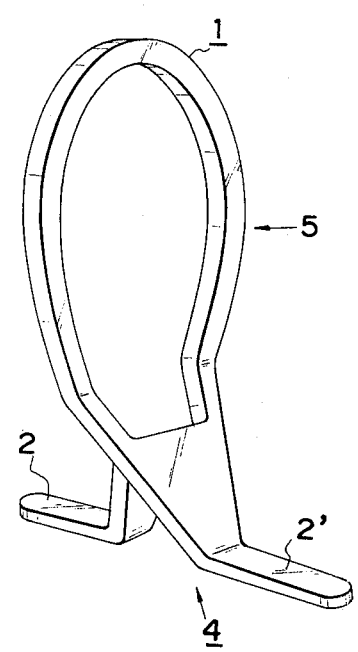

A flat frame 3 which consists of a guide ring 1, and a pair of legs 2, 2' integrally formed with the guide ring 1 and extending from a base portion thereof such that one of the legs extends to the inside of the guide ring 1 with the other extending to the outside thereof, is formed by punching sheet metal such as stainless steel or brass. The legs 2, 2' are then bent in opposite directions to erect the guide ring 1 and form a mount 4 consisting of front and rear legs 2, 2'. Thus, a guide body 5 shown in FIG. 2 is obtained.

Figure 3:
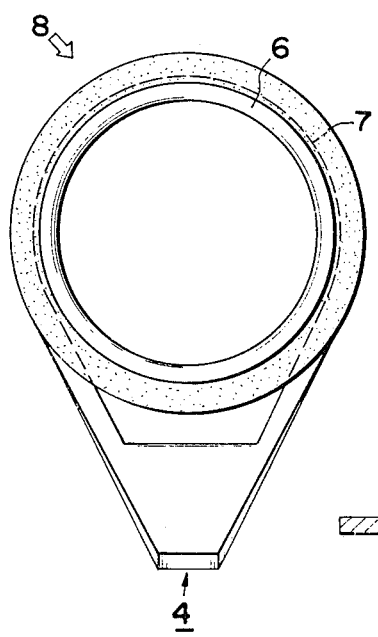
Figure 4:
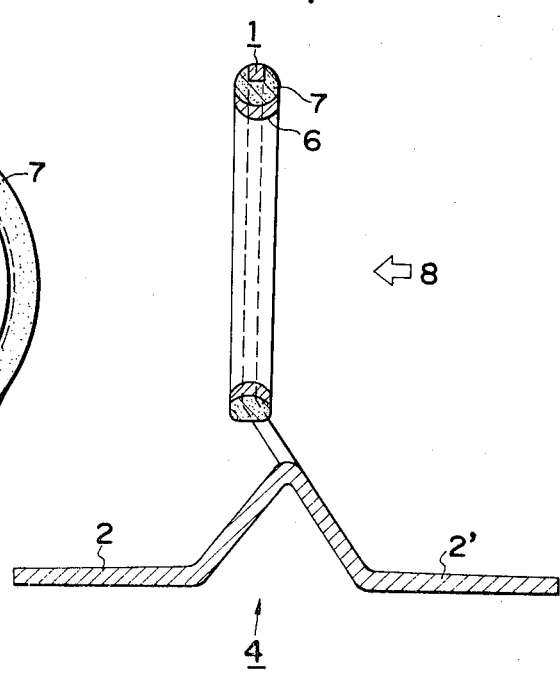

A ring unit 7, which consists of a synthetic resin and which has a hard inner ring 6 firmly fitted therein, is fitted in the inner circumferential surface of the guide ring 1 of the guide body 5, to obtain a guide device 8 shown in FIGS. 3 and 4.

The production of a guide device of a second embodiment of the present invention will be described with reference to FIGS. 4–8.

A flat frame 3 is so punched out of a single piece of sheet metal that a portion of a guide ring 1 that is opposed to a root of the legs 2, 2' is split to form a gap 9, thereby to allow the front leg 2 to be extended therethrough to the outside of the guide ring 1. In this embodiment, the legs 2, 2' can be formed to an arbitrary length. The legs 2, 2' are bent in opposite directions in the same manner as in the first embodiment to obtain a guide body 5. A reinforcement ring 7, which consists of a synthetic resin and which has an inner ring 6 for a fishing line, is fitted in recesses 10 in the inner circumferential surface of the guide ring 1 and through the gap 9. As a result, a guide device 8 for fishing lines is obtained.

Each of the guide devices in the above embodiments, the construction of which is as described above, is set on a fishing rod with a thread or other fastening means in such a manner that the leg 2 is on the side of the tip of the fishing rod with the leg 2' on the side of the base end thereof. A fishing line is guided in an ordinary manner as it is passed through the reinforcement ring 7.

The present invention is not, of course, limited to the above embodiments; it may be modified in various ways within the scope of the appended claims.

What is claimed is:

1. A line guide device comprising a guide ring portion, a base portion at one side of said ring portion, a pair of leg portions extending from said base portion, said leg portions each having a tip portion aligned with each other and adaptable to be used as means to fit said device onto a fishing rod, said tip portions being located at substantially right angles to the plane of said ring portion, said base portion and portions of said leg portions being formed into an inverted "V"-shape with the apex of the "V" at said ring portion and with said tip portions of said leg portions extending away from each other at respective outer ends of said "V", said leg portions merging at the apex of said "V", at least one of said leg portions extending beyond said apex in the plane of said at least one leg portion and merging into said ring portion, and reinforcement line guide means fitted into said ring portion.

2. The device of claim 1, wherein said guide ring portion is formed with a gap at the portion thereof opposite said base portion, and one of said leg portions having a developed length greater than the diameter of said ring portion.

3. The device of claim 1, wherein said ring portion is continuous, and one of said leg portions has a developed length less than the diameter of said ring portion.

4. The device of claim 1, wherein said reinforcement guide means comprises ring means comprising a synthetic resin and a hard inner ring fitted into the inner circumferential surface thereof, and said resin is fitted firmly into the inner circumferential surface of said guide ring portion.

5. The device of claim 1, wherein said guide ring portion is formed with recesses in the inner circumferential surface thereof, said reinforcement ring means comprises a synthetic resin and a hard inner ring fitted in the inner circumferential surface, and said resin is firmly set inside said guide ring portion such that said recesses are filled with said synthetic resin.

6. A stamped one-piece flat metal blank for producing a line guide device comprising a guide ring portion, a base portion at one side of said ring portion, a pair of leg portions extending in opposite directions from said base portion, one of said leg portions extending into said guide ring portion and the other of said leg portions extending outwardly of said ring portion, said leg portions being aligned with each other, and the tip portions of said leg portions being adaptable to be used as means to fit said device onto a fishing rod after said blank is bent into said device.

7. The blank of claim 6, wherein said guide ring portion is formed with a gap at the portion thereof opposite said base portion, and said leg portion extending into said ring portion has a length greater than the diameter of said ring portion and extends through said gap.

8. The blank of claim 6, wherein said ring portion is continuous, and said leg portion extending into said ring has a length less than the diameter of said ring portion and is contained in said ring portion.

9. A process for producing a line guide device comprising the steps of punching a blank out from a single piece of sheet metal; bending portions of said legs and said base portion into an inverted "V" shape; performing said bending step so as to cause said leg portions to merge together at an apex of said inverted "V"-shape and to cause at least one of said leg portions to extend beyond said apex in the plane of said at least one leg portion to merge into said ring portion; bending the tips of said legs to be substantially at right angles to said guide ring to form fitting legs to fit said line guide device to a fishing rod; and fitting line guide ring means into said guide ring.

10. The process of claim 9, wherein said guide ring is punched out with a gap at the portion thereof opposite said base portion, and dimensioning one of said leg portions with a developed length greater than the diameter of said guide ring.

11. The process of claim 9, and forming said guide ring as a continuous ring, and dimensioning one of said leg portions with a developed length less than the diameter of said guide ring.

12. The process of claim 9, including forming said line guide ring means in the form of a reinforcement ring which comprises a synthetic resin, fitting a hard inner ring in the inner circumferential surface of said resin, and fitting said resin firmly into the inner circumferential surface of said guide ring.

13. The process of claim 9, including forming said guide ring with recesses in the inner circumferential surfaces thereof, forming said line guide ring means as a reinforcement ring made of a synthetic resin, fitting a hard inner ring in the inner circumferential surface thereof, and fitting said resin firmly inside said guide ring such that said recesses are filled with said synthetic resin.

* * * * *